United States Patent
Lee et al.

(10) Patent No.: US 11,830,132 B2
(45) Date of Patent: Nov. 28, 2023

(54) DEVICE FOR PROCESSING FACE FEATURE POINT ESTIMATION IMAGE ON BASIS OF STANDARD FACE MODEL, AND PHUSICAL COMPUTER-READABLE RECORDING MEDIUM IN WHICH PROGRAM FOR PROCESSING FACE FEATURE POINT ESTIMATION IMAGE ON BASIS OF STANDARD FACE MEDEL IS RECORDED

(71) Applicant: DEEPIXEL INC., Seoul (KR)

(72) Inventors: Jehoon Lee, Seoul (KR); Wahseng Yap, Seoul (KR)

(73) Assignee: DEEPIXEL INC., Seoul (KR)

(*) Notice: Subject to any disclaimer, the term of this patent is extended or adjusted under 35 U.S.C. 154(b) by 290 days.

(21) Appl. No.: 17/295,272

(22) PCT Filed: Dec. 6, 2018

(86) PCT No.: PCT/KR2018/015407
§ 371 (c)(1),
(2) Date: May 19, 2021

(87) PCT Pub. No.: WO2020/116685
PCT Pub. Date: Jun. 11, 2020

(65) Prior Publication Data
US 2022/0012472 A1 Jan. 13, 2022

(51) Int. Cl.
*G06T 17/00* (2006.01)
*G06T 7/70* (2017.01)
(Continued)

(52) U.S. Cl.
CPC ............... *G06T 17/00* (2013.01); *G06T 7/70* (2017.01); *G06T 19/20* (2013.01); *G06V 20/647* (2022.01);
(Continued)

(58) Field of Classification Search
None
See application file for complete search history.

(56) References Cited

U.S. PATENT DOCUMENTS

| | | | |
|---|---|---|---|
| 6,879,323 B1 * | 4/2005 | Takezawa | G06T 17/00 340/5.83 |
| 9,747,493 B2 | 8/2017 | Rodriguez et al. | |

(Continued)

FOREIGN PATENT DOCUMENTS

| | | |
|---|---|---|
| KR | 10-2003-0096965 A | 12/2003 |
| KR | 10-2016-0088223 A | 7/2016 |

(Continued)

*Primary Examiner* — Kee M Tung
*Assistant Examiner* — Jed-Justin Imperial
(74) *Attorney, Agent, or Firm* — Bridgeway IP Law Group, PLLC; Sang Ho Lee; Hyun Woo Shin (57) ABSTRACT

An image processing method includes the steps of: extracting a first two-dimensional feature point from a two-dimensional face image; on the basis of a geometric model of a standard face, deriving a three-dimensional feature point set including a first three-dimensional feature point corresponding to the first two-dimensional feature point; generating a three-dimensional face model including the three-dimensional feature point set; estimating an input pose of the two-dimensional face image to determine whether to update the three-dimensional feature point set; updating the three-dimensional feature point set by relocating the first three-dimensional feature point according to the first two-dimensional feature point, on the basis of the determination on whether to update the three-dimensional feature point set; and projecting the three-dimensional face model onto the two-dimensional face image. The present invention comprises a physical computer-readable recording medium in which a program for executing, in a computer, an image processing method is recorded.

15 Claims, 5 Drawing Sheets

(51) Int. Cl.
*G06V 40/16* (2022.01)
*G06T 19/20* (2011.01)
*G06V 20/64* (2022.01)

(52) U.S. Cl.
CPC .......... *G06V 40/171* (2022.01); *G06V 40/172* (2022.01); *G06T 2219/2004* (2013.01); *G06T 2219/2021* (2013.01)

(56) References Cited

U.S. PATENT DOCUMENTS

2013/0287294 A1* 10/2013 Ye .......................... G06T 17/00
382/154
2016/0086017 A1* 3/2016 Rodriguez ........... G06V 40/172
382/118

FOREIGN PATENT DOCUMENTS

| KR | 10-1647803 B1 | 8/2016 |
| KR | 10-2017-0006219 A | 1/2017 |
| KR | 10-2018-0100476 A | 9/2018 |

* cited by examiner

DEVICE FOR PROCESSING FACE FEATURE POINT ESTIMATION IMAGE ON BASIS OF STANDARD FACE MODEL, AND PHUSICAL COMPUTER-READABLE RECORDING MEDIUM IN WHICH PROGRAM FOR PROCESSING FACE FEATURE POINT ESTIMATION IMAGE ON BASIS OF STANDARD FACE MEDEL IS RECORDED

TECHNICAL FIELD

Various embodiments of the present invention relate to an apparatus for processing a standard face model-based facial landmark estimation image, and a computer-readable physical recording medium on which a program for processing a standard face model-based facial landmark estimation image is recorded.

BACKGROUND ART

A technology for detecting and tracking faces in real-time inputted images has long been studied. In recent years, various services using this technology have been released and used. For example, there are provided a service of converting a user's face obtained from a camera of a smart phone into an augmented reality avatar, a service of recognizing a face to unlock a smart phone or use the recognized face for various authentications, a service of recognizing a facial expression to take a picture when a smiling face is made, and the like.

In order to implement such services, technologies for face detection, face tracking, and facial landmark detection are generally required.

In general, the facial landmark detection is implemented using machine learning, where facial data for learning for which annotation is performed on a facial landmark is required. Performing annotation is also referred to as annotating data or performing an annotation operation. Data annotation, annotation operation, or annotation may include an operation of adding metadata to data, labeling a specific portion of data, or the like. In the present specification, data annotation or annotation operation is described as annotating facial landmarks, and refers to annotating or marking a landmark at a specific position (for example, eyes, nose, ears, mouth, or the like) of a facial image.

The positions and number of facial landmarks in the facial data to be used for machine learning may vary depending on the function of an application. For example, with respect to an application that requires positions of the eyes, nose, and mouth of a face, facial data is required in which several to tens of landmarks are annotated at the positions of the eyes, nose, and mouth. Alternatively, with respect to an application that requires an entire face including a jaw line and a shape of a mouth, facial data may be required in which tens to hundreds of landmarks capable of representing detailed portions of the entire face are annotated.

Therefore, after pre-defining the positions and number of different landmarks depending on the functions provided by the application, a large amount of facial data is collected, and learning data is collected through an operation of annotating the landmarks. Thus, there is inconvenience of collecting new learning data even when the function of the application changes slightly.

DISCLOSURE OF THE INVENTION

Technical Problem

The present invention provides an image processing apparatus capable of performing landmark estimation by estimating a landmark that is not extracted from an obtained two-dimensional facial image based on a geometric model of a standard face even when machine learning is performed using facial data in which a landmark to be estimated is not annotated, and a physical recording medium storing a program for performing an image processing method.

The present invention provides an image processing apparatus and a physical recording medium storing a program for performing an image processing method applicable to various types of applications because a landmark may be estimated based on a geometric model of a standard face even when there is no image data including a type of landmark information required by an application.

Technical Solution

The present invention includes a computer-readable physical recording medium that performs image processing for estimating a facial landmark on a two-dimensional facial image based on a standard face model, the computer-readable physical recording medium on which a program for executing following steps is recorded. The program includes extracting a two-dimensional first landmark from the two-dimensional facial image, deriving, based on a geometric model of a standard face, a three-dimensional landmark set including a three-dimensional first landmark corresponding to the two-dimensional first landmark, determining whether to update the three-dimensional landmark set by estimating a pose of the two-dimensional facial image, updating the three-dimensional landmark set by rearranging the three-dimensional first landmark according to the two-dimensional first landmark according to the determining of whether to update, and projecting the three-dimensional face model onto the two-dimensional facial image.

In one embodiment, the three-dimensional landmark set may include a three-dimensional second landmark defining a landmark different from the three-dimensional first landmark.

In one embodiment, the step of determining whether to update the three-dimensional landmark set may determine based on a pitch and a yaw of a pose of the two-dimensional facial image, whether to update a three-dimensional landmark set.

In one embodiment, the step of updating the three-dimensional landmark set may include a step of deriving a two-dimensional second landmark by projecting the three-dimensional first landmark onto a two-dimensional plane, a step of deriving a two-dimensional third landmark by rearranging, based on a similarity between the two-dimensional second landmark and the two-dimensional first landmark, the two-dimensional second landmark to correspond to the two-dimensional first landmark, a step of updating, based on the two-dimensional third landmark, the three-dimensional landmark set, and a step of generating, based on the updated three-dimensional landmark set, the three-dimensional face model.

In one embodiment, the step of deriving the two-dimensional third landmark may include a step of calculating a similarity transformation from the two-dimensional first landmark to the two-dimensional second landmark, and a step of deriving the two-dimensional third landmark through vector dot products of the two-dimensional first landmark and the similarity transformation.

The program according to the present invention may further perform a step of generating, based on the two-dimensional third landmark and a geometric model of a standard face, the three-dimensional face model.

In one embodiment, the geometric model of the standard face may include information on a distance between at least two of eyes, nose, mouth, and ears.

According to an embodiment, the program according to the present invention may further perform a step of selecting, with respect to two two-dimensional third landmarks that face each other based on a face central line of a two-dimensional plane, one two-dimensional third landmark having a small distance difference between the two-dimensional third landmark and a two-dimensional second landmark corresponding to the two-dimensional third landmark; and a step of replacing another two-dimensional third landmark by symmetrizing the selected one two-dimensional third landmark based on the face central line.

In order to perform following steps on a computer that applies a three-dimensional face model to a two-dimensional facial image, a program may be recorded on a physical recording medium that is readable by the computer. Both the physical recording medium on which the program is recorded and the program recorded on the physical storage medium may be within the scope of the present invention. The program executes steps of: extracting a two-dimensional first landmark from a two-dimensional facial image, deriving, based on a geometric model of a standard face, a three-dimensional landmark set including a three-dimensional first landmark corresponding to the two-dimensional first landmark, deriving a two-dimensional second landmark by projecting the three-dimensional first landmark onto a two-dimensional plane, rearranging, based on a similarity between the two-dimensional second landmark and the two-dimensional first landmark, the two-dimensional second landmark as a two-dimensional third landmark, and re-deriving, based on the two-dimensional third landmark, the three-dimensional landmark set.

In one embodiment, the program recorded on the physical recording medium may execute a step of projecting the three-dimensional landmark set onto the two-dimensional facial image.

In one embodiment, the program recorded on the physical recording medium may perform a step of displaying a visual object with respect to at least one landmark among the three-dimensional landmark set.

In one embodiment, the three-dimensional landmark set includes a three-dimensional second landmark different from the three-dimensional first landmark, and the step of re-deriving, based on the two-dimensional third landmark, the three-dimensional landmark set may include a step of inserting a z coordinate of the three-dimensional first landmark with respect to the two-dimensional third landmark, and a step of deriving, based on a geometric model of a standard face, a three-dimensional fourth landmark with respect to a three-dimensional third landmark into which the z coordinate is inserted.

In one embodiment, the program recorded on the physical recording medium may further perform a step of receiving an input for selecting the three-dimensional second landmark.

In one embodiment, the step of rearranging, based on a similarity between the two-dimensional second landmark and the two-dimensional first landmark, the two-dimensional second landmark as a two-dimensional third landmark may include a step of calculating a similarity transformation from the two-dimensional first landmark to the two-dimensional second landmark, and a step of deriving the two-dimensional third landmark through vector dot products of the two-dimensional first landmark and the similarity transformation.

An image processing apparatus according to the present invention may include a two-dimensional image processor configured to extract a two-dimensional first landmark from a two-dimensional facial image and project a three-dimensional face model onto the two-dimensional facial image, a three-dimensional model generator configured to derive, based on a geometric model of a standard face, a three-dimensional landmark set including a three-dimensional first landmark corresponding to the two-dimensional first landmark, and a controller configured to determine, based on the two-dimensional facial image, whether to update the three-dimensional landmark set, and control the three-dimensional model generator to selectively update the three-dimensional landmark set by comparing the three-dimensional first landmark and the two-dimensional first landmark.

In one embodiment, the three-dimensional model generator may be configured to generate the three-dimensional landmark set by calculating, based on the geometric model of the standard face, a three-dimensional second landmark different from the three-dimensional first landmark.

In one embodiment, the three-dimensional model generator may be configured to define the three-dimensional first landmark as a two-dimensional second landmark by projecting the three-dimensional first landmark onto a two-dimensional plane, rearrange, based on a similarity transformation from the two-dimensional first landmark to the two-dimensional second landmark, the two-dimensional second landmark as a two-dimensional third landmark, and update, based on the rearranged two-dimensional third landmark, the three-dimensional landmark set.

Effects

According to various embodiments disclosed herein, additional landmarks are derived through a geometric model of a standard face based on a landmark obtained from a two-dimensional facial image to generate a three-dimensional face model. Accordingly, it is possible to estimate position information of a specific portion of a face even when learning is performed with facial data in which a landmark for a specific position of the face is not annotated. Therefore, it is possible to adaptively estimate a landmark position of a specific face portion based on existing data even with respect to applications having different purposes.

According to various embodiments disclosed herein, it is possible to provide an image processing apparatus capable of providing flexibility when securing data for machine learning and a physical recording medium on which a program for performing an image processing method is recorded. When a landmark is estimated according to the present invention, a data augmentation service or the like capable of adding an estimated landmark in addition to a landmark annotated in existing facial data may be provided, thereby securing much more data.

Furthermore, it should be understood that various embodiments disclosed herein are illustrative, and various modifications, changes, substitutions, and additions may be made by those skilled in the art through the spirit and scope of the appended claims, and such modifications and alterations are within in the appended claims.

BEST MODE FOR CARRYING OUT THE INVENTION

Hereinafter, various embodiments of the present invention will be described in detail with reference to the accompanying drawings. The same reference numerals are used for the same components in the drawings, and redundant descriptions of the same components are omitted.

With respect to various embodiments of the present invention disclosed herein, specific structural and functional descriptions are exemplary to merely describe embodiments of the present invention. The various embodiments of the present invention may be implemented in various forms, and should not be construed as being limited to the embodiments described herein.

Terms "first," "second," "A," "B," and the like used in various embodiments may modify various components regardless of order and/or importance, and do not limit the components. For example, without departing from the scope of the present invention, a first component may be referred to as a second component, and similarly, the second component may be also referred to as the first component.

Terminologies are used herein to merely describe specific embodiments, and may not be intended to limit the scope of other embodiments. Singular forms "a," "an," and "the," may include plural forms unless the context clearly indicates otherwise.

All terms used herein, including technical or scientific terms, may have the same meaning as commonly understood by those skilled in the art to which the present invention pertains. Terms, such as those defined in commonly used dictionaries, may be interpreted as having a meaning that is consistent or similar with their meaning in the context of the relevant art, and are not to be interpreted in an idealized or overly formal sense unless expressly so defined herein. In some cases, even terms defined herein may not be interpreted to exclude embodiments of the present invention.

Figure 1:
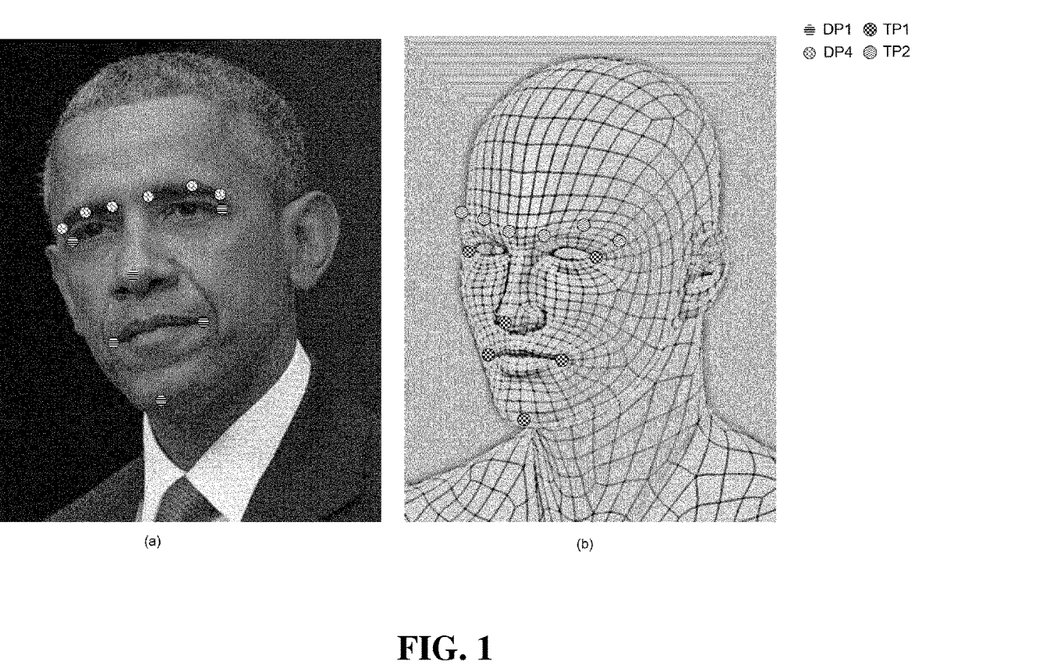
FIG. 1 is a conceptual diagram illustrating an image processing method and image processing performed by an image processing apparatus, according to an embodiment of the present invention.

FIG. 1 is a conceptual diagram illustrating an image processing method and image processing performed by an image processing apparatus, according to an embodiment of the present invention.

In FIG. 1, (a) is an obtained two-dimensional facial image, and (b) is a three-dimensional face model. First, a two-dimensional first landmark DP1 may be extracted from the two-dimensional facial image illustrated in (a) by using a facial landmark detection algorithm.

The extracted two-dimensional first landmark DP1 may include a nose end point, a lip end point, a chin end point, and an eye end point of a face. However, there may be a case where it is desired to obtain another landmark such as a second-dimensional fourth landmark DP4 marking an eyebrow trajectory that a user desires to obtain, in addition to the extracted two-dimensional first landmark DP1. In addition, according to an embodiment, there may be an application that requires information on a landmark different from that extracted from the two-dimensional facial image.

The present invention provides a method for obtaining an unextracted landmark from the two-dimensional facial image by using the facial landmark detection algorithm. Accordingly, there is provided an image processing apparatus and image processing method capable of generating a facial landmark to be obtained with high accuracy by using a three-dimensional standard face model even when there is no machine learning data including a landmark to be extracted. In addition, the image processing apparatus and image processing method according to the present invention are also applicable to various landmark information required by various applications.

Accordingly, in the present invention, it is possible to generate a three-dimensional face model including a third-dimensional second landmark TP2 for the eyebrow trajectory that the user desires to obtain while including the three-dimensional first landmark TP1 for the same face object position as that of the two-dimensional first landmark DP1 extracted from a two-dimensional facial image, as illustrated in (b) of FIG. 1.

In the present invention, the three-dimensional first landmark TP1 and the three-dimensional second landmark TP2 are collectively referred to as a three-dimensional landmark set. The three-dimensional first landmark TP1 is a landmark corresponding to the two-dimensional first landmark DP1 obtained from the two-dimensional facial image, and the three-dimensional second landmark TP2 is a landmark corresponding to a two-dimensional fourth landmark DP4 that is a landmark to be obtained from the two-dimensional facial image in addition to the two-dimensional first landmark DP1. The three-dimensional second landmark TP2 may be estimated based on the three-dimensional first landmark TP1, on the basis of the three-dimensional standard face model. The three-dimensional first landmark TP1 may be referred to as "non missing point", and the three-dimensional second landmark TP2 may be referred to as "missing point".

According to an embodiment, the three-dimensional second landmark TP2 estimated based on the three-dimensional first landmark TP1 may be specified according to the user's selection, or may be determined according to a type of the three-dimensional first landmark TP1. For example, after the two-dimensional first landmark DP1 for the eye end point is extracted and a corresponding three-dimensional second landmark TP1 for the eye end point is derived, the user may request to estimate the accurate three-dimensional second landmark TP2 by selecting a certain portion of an eyebrow.

The three-dimensional face model may be generated based on a position of a face indicated by the two-dimensional first landmark DP1, and geometric information on a standard face. Therefore, the three-dimensional face model may be a generally applicable three-dimensional model, rather than a model optimized for the two-dimensional facial image obtained as illustrated in (a) of FIG. 1. However, a landmark to be extracted may be determined according to the user's selection or a request of an external application.

As the generated three-dimensional face model is directly projected onto the two-dimensional facial image, the three-dimensional second landmark TP2 may be derived as a two-dimensional fourth landmark DP4. However, according to an embodiment, the three-dimensional face model may be appropriately modified/updated with respect to the two-dimensional facial image.

For example, when a new user is registered, when a geometric relationship of the two-dimensional first landmark DP1 obtained from the user is determined to be a face different from a previous face, when the user gazes at the front, when a preset time has elapsed, or the like, the three-dimensional face model may be modified/updated.

In the present invention, it is possible to update the three-dimensional landmark set based on a relationship between the three-dimensional first landmark TP1 and the two-dimensional first landmark DP1, and to generate a three-dimensional face model accordingly. Generating a three-dimensional face model by updating the three-dimensional landmark set may be understood in substantially the same sense.

A method for updating the three-dimensional face model is described in detail below with reference to FIG. 3.

If necessary, the three-dimensional first landmark TP1 specified to correspond to the two-dimensional first landmark DP1 extracted from the already obtained two-dimensional facial image may be projected onto the two-dimensional facial image as a two-dimensional second landmark (not illustrated), and then may be rearranged as a two-dimensional third landmark (not illustrated) to have a similarity with the two-dimensional first landmark DP1. The three-dimensional face model may be regenerated based on the rearranged two-dimensional third landmark.

Regeneration (updating or re-deriving) of the three-dimensional face model is performed according to a process of transforming a two-dimensional second landmark projected onto two dimensions into a two-dimensional third landmark according to a relationship between the two-dimensional first landmark DP1 and the three-dimensional first landmark TP1, and re-obtaining a three-dimensional second landmark by transferring the transformed two-dimensional third landmark into three dimensions. Here, the two-dimensional third landmark transferred into three dimensions substantially corresponds to a landmark of a face object that is the same as the three-dimensional first landmark TP1 before being regenerated, but may be understood as a landmark at a position that is more adaptively rearranged on the 2-dimensional facial image.

Thereafter, when the modified/updated three-dimensional face model is projected again onto the two-dimensional facial image, it is possible to obtain the two-dimensional fourth landmark DP4 which is based on the geometric model of the standard face and is suitable for the obtained two-dimensional facial image.

In addition, in a process of projecting the three-dimensional face model onto the two-dimensional facial image, a corresponding position of the two-dimensional first landmark DP1 may be also different depending on the three-dimensional first landmark TP1 of the regenerated three-dimensional face model.

Needless to say, it is also possible to obtain the two-dimensional fourth landmark DT4 by directly projecting the three-dimensional second landmark TP2 onto the two-dimensional facial image without updating the three-dimensional face model.

Figure 2:
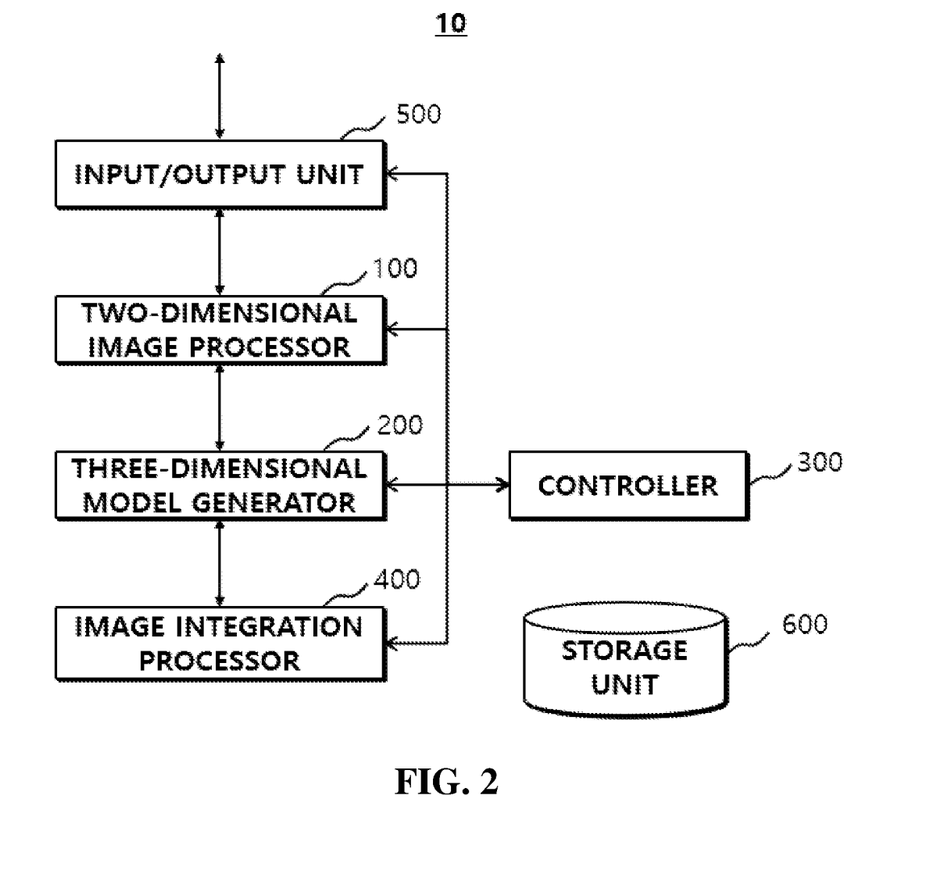
FIG. 2 is a diagram illustrating an exemplary configuration of an image processing apparatus that performs an image processing method, according to an embodiment of the present invention.

FIG. 2 is a diagram illustrating an exemplary configuration of an image processing apparatus that performs an image processing method, according to an embodiment of the present invention.

Referring to FIG. 2, an image processing apparatus 10 may include a two-dimensional image processor 100, a three-dimensional model generator 200, and a controller 300.

The two-dimensional image processor 100 may obtain a two-dimensional facial image to extract the two-dimensional first landmark DP1 according to a facial landmark detection algorithm.

The two-dimensional image processor 100 may project a three-dimensional face model generated by the three-dimensional model generator 200 onto the two-dimensional facial image.

The three-dimensional model generator 200 may derive a three-dimensional first landmark corresponding to the two-dimensional first landmark, based on a geometric model of a standard face. However, a desired face may not be completed only with the obtained two-dimensional first landmark. For example, when a partial facial image is cut off from the two-dimensional facial image, or when a front two-dimensional facial image is obtained, but a three-dimensional movement of turning a head from side to side is performed, it may be required to detect a position of an ear.

The three-dimensional model generator 200 may derive a three-dimensional second landmark different from the three-dimensional first landmark, based on the geometric model of the standard face. The three-dimensional second landmark may include a landmark specified by a user (for example, an eyebrow, ear top point, and ear bottom point) based on a geometric model of a standard face provided in an internal or external database, or a landmark positioned in an area specified by the user (for example, an entire ear area). Therefore, the three-dimensional second landmark may be determined in response to a signal received from the outside.

According to an embodiment, the geometric model of the standard face used by the three-dimensional model generator 200 may include information on a different number of landmarks in a specific area depending on a depth. As the depth increases, the number of landmarks included in the same area may increase. That is, a depth of the geometric model of the standard face may be associated with precision. The depth of the geometric model of the standard face may be determined according to the user's selection or a type of a program for which the image processing apparatus is to be used. In another embodiment, the three-dimensional model generator 200 may use a three-dimensional face model having different heights, widths, and depths with respect to different domains (for example, Asians or westerners, male or female, or age). A suitable domain of the three-dimensional face model may be selected by managing the three-dimensional face model for each domain and analyzing the two-dimensional facial image, or the three-dimensional face model determined according to the user's designation may be used.

The three-dimensional model generator 200 may derive a three-dimensional landmark set including the three-dimensional first landmark and three-dimensional second landmark. The three-dimensional face model is generated through three-dimensional landmark sets.

The controller 300 may determine whether to update the three-dimensional landmark set by estimating a pose from the two-dimensional facial image. When the update is necessary, the controller 300 may allow the three-dimensional model generator 200 to update the three-dimensional face model. In the present specification, updating of the three-dimensional landmark set and re-deriving of the three-dimensional landmark set are used in substantially the same sense. As the three-dimensional landmark set is updated or re-derived, the three-dimensional face model may be naturally updated and re-derived.

According to an embodiment, the controller 300 may control the three-dimensional model generator 200 to perform the same process as a process of updating the three-dimensional face model through two-dimensional projection, rearrangement, and the like so as to increase a matching degree with the two-dimensional facial image immediately in an initial stage without determining whether to update.

According to an embodiment, the image processing apparatus 10 according to the present invention may further include an image integration processor 400. The image integration processor 400 may project the three-dimensional face model onto the two-dimensional facial image through the two-dimensional image processor 100, and may display a virtual object together on the two-dimensional facial image by using landmarks obtained from the three-dimensional face model. That is, it can be understood that the image integration processor 400 represents a sort of augmented reality.

The image integration processor 400 may minimize a sense of incompatibility in displaying the virtual object as the already generated three-dimensional face model is applied to the two-dimensional facial image obtained in real time.

According to an embodiment, the image processing apparatus 10 may further include an input/output unit 500. The input/output unit 500 may include a visual input/output means that obtains a two-dimensional facial image of a user or displays visual information together with the obtained image, an audio input/output means that receives a voice command of the user or provides a voice feedback or voice effect to the user, an input means that receives a touch input of the user, a means that provides an output such as vibration to the user, and the like. For example, the input/output unit 500 may receive a user input for deriving the three-dimensional second landmark.

According to an embodiment, the image processing apparatus 10 may further include a storage unit 600. The storage unit 600 may store the two-dimensional facial image and landmark information, and may store information on the geometric model of the standard face, and thus may be used to derive a three-dimensional landmark.

In addition, the storage unit 600 may store a three-dimensional face model for each specific user with respect to the image processing apparatus 10. Accordingly, with respect to some users, image processing may be performed by using a three-dimensional face model transformed from the geometric model of the standard face. In another embodiment, the storage unit 600 may have different geometric features depending on age, gender, nationality, and the like, and the storage unit 600 may generate a three-dimensional face model by selectively applying geometric models of a plurality of standard faces.

In relation to FIG. 2, it is described for each unit that performs a function, but the image processing apparatus 10 may include a recording medium on which a program for performing a corresponding function is recorded, and input/output means for interacting with the recording medium.

Figure 3:
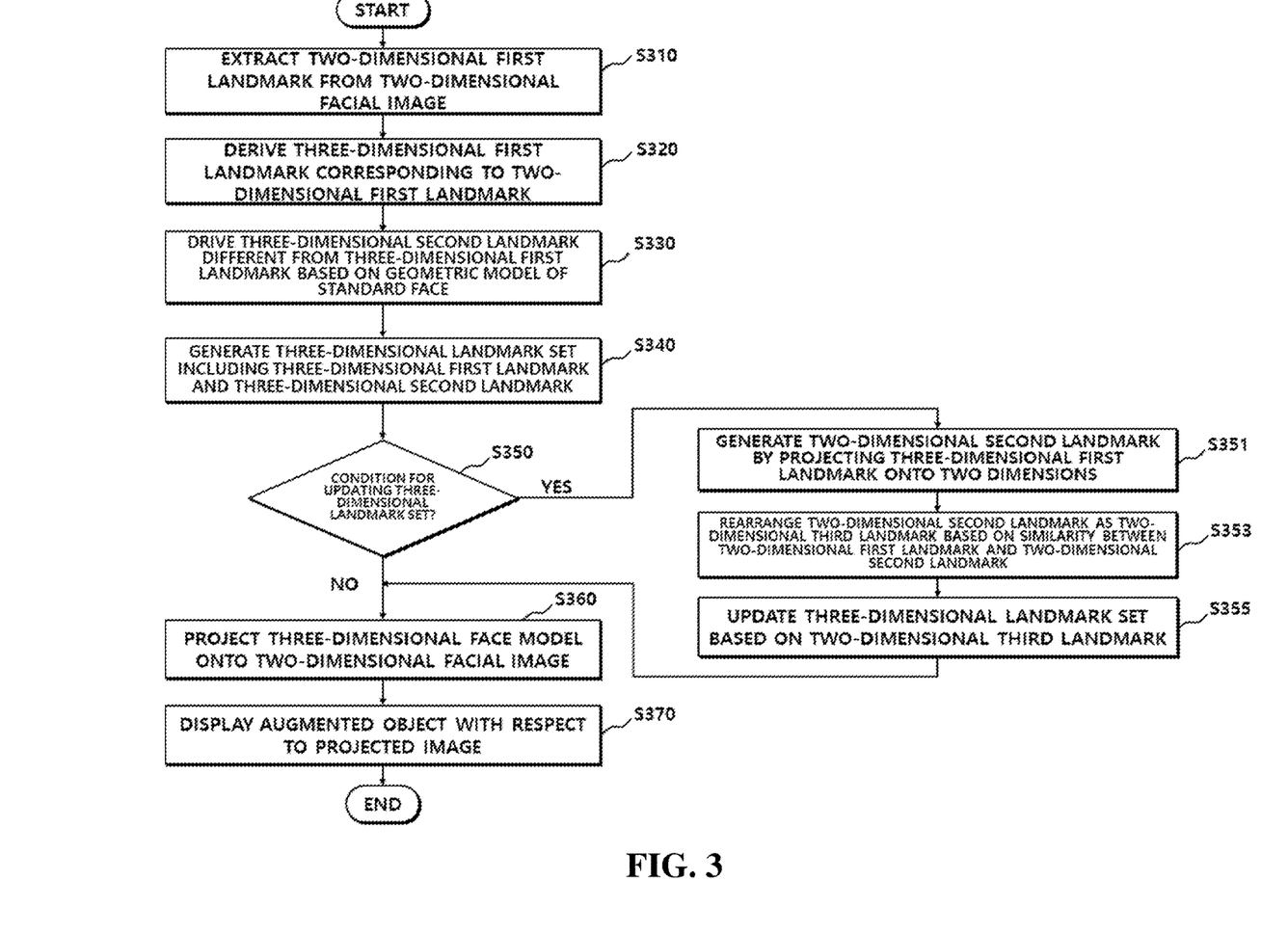
FIG. 3 is a diagram illustrating an image processing method according to an embodiment of the present invention.

FIG. 3 is a diagram illustrating an image processing method according to an embodiment of the present invention. The image processing method may be performed through the image processing apparatus 10 described with reference to FIG. 2.

Referring to FIG. 3, the two-dimensional image processor 100 extracts a two-dimensional first landmark from a two-dimensional facial image (step S310). It may correspond to the step of extracting the two-dimensional first landmark DP1 from the two-dimensional facial image of (a) of FIG. 1. In the present invention, the two-dimensional image processor 100 may extract the two-dimensional first landmark DP1 through a known facial landmark extraction algorithm.

The three-dimensional model generator 200 derives a three-dimensional first landmark corresponding to the two-dimensional first landmark (step S320). The three-dimensional first landmark may be understood as a landmark for facial positions corresponding to the two-dimensional first landmark.

All desired landmarks may not be obtained only with the landmark extracted from the two-dimensional facial image, or face learning data already obtained through machine learning may be provided, but desired landmark information may be omitted from the face learning data.

In order to derive a landmark to be obtained, the three-dimensional model generator 200 derives a three-dimensional second landmark by using the geometric model of the standard face.

Figure 4:
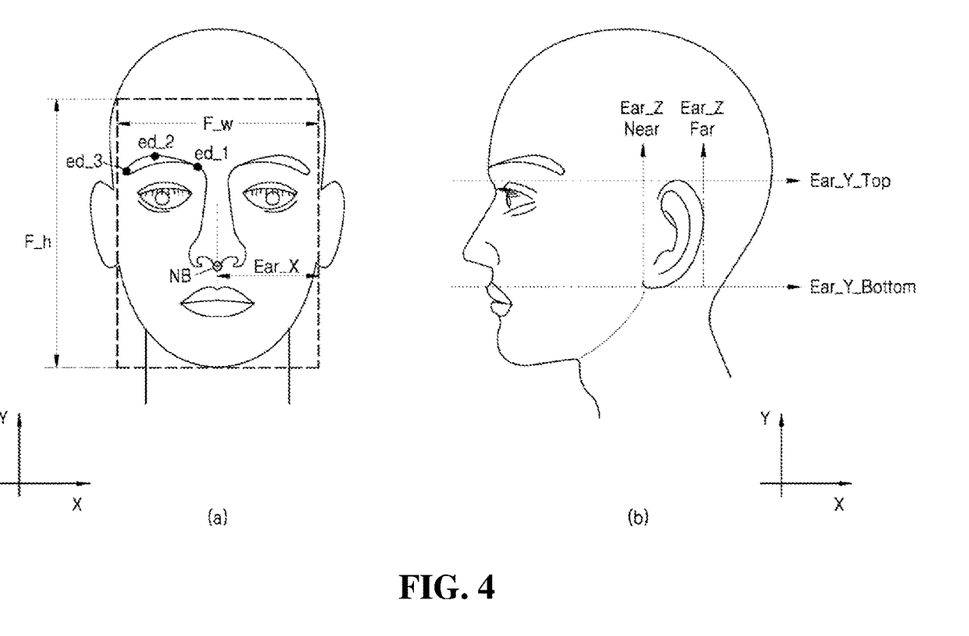
FIG. 4 is a diagram illustrating a method of deriving a three-dimensional second landmark.

FIG. 4 is a diagram illustrating a method for deriving a three-dimensional second landmark.

(a) of FIG. 4 illustrates a front face (xy plane), and (b) of FIG. 4 illustrates a side face (yz plane). It can be understood that FIG. 4 illustrates a front (a) and a side (b) of a three-dimensional face model viewed from respective directions of two dimensions.

It is assumed that the two-dimensional image processor 100 extracts a nose end point NB and three landmarks eb_1, eb_2, and eb_3 constituting an eyebrow, and detects face areas F_w and F_h from the two-dimensional facial image. Accordingly, it is possible to determine three-dimensional landmarks corresponding to the two-dimensional landmarks extracted as described above.

According to an embodiment, the three-dimensional landmarks may be determined only based on a type of a landmark obtained from the two-dimensional facial image. That is, in this case, a facial feature is not the same in comparison to the obtained two-dimensional facial image. However, in the standard face, corresponding types of landmarks may be selected. In addition, in another embodiment, a landmark adaptively transformed on the two-dimensional facial image may be transformed to three dimensions to determine three-dimensional landmarks.

With respect to the extracted landmark, the geometric model of the standard face may be used to derive landmarks defining an ear of a face. According to an embodiment, the geometric model of the standard face may include information on an area and proportion occupied by each portion of the face, and information on a distance between respective objects.

A top-of-ear y coordinate Ear_Y_Top.y may be calculated through a predetermined ratio of sum of y coordinates of the three landmarks eb_1, eb_2, and eb_3 constituting the eyebrow, and a bottom-of-ear y coordinate Ear_Y_Bottom.y may be calculated through a ratio of a y coordinate of a nose end point NB. In addition, a facial directional front end-of-ear z coordinate Ear_Z_Near.z has a z coordinate corresponding to a width F_w of a face area, and an occipital directional rear end-of-ear z coordinate Er_Z-Far.z may be calculated through a ratio of the facial directional front end-of-ear z coordinate Ear_Z_Near.z and the face area width F_w. When coordinates of a particular point are thus obtained, different coordinates may be derived from the geometric model of the standard face. This in turn may be referred to as deriving a missing point based on a non missing point.

When unconditionally updating a three-dimensional first landmark at an initial stage, that is, when transforming the three-dimensional first landmark to match the two-dimensional facial image, a process of deriving a three-dimensional second landmark may be omitted, and a process of generating a three-dimensional third landmark by transforming the three-dimensional first landmark to match a two-dimensional first landmark, and then deriving a three-dimensional fourth landmark may be performed (described in detail in step S355).

Referring back to FIG. 3, a three-dimensional landmark set including the three-dimensional first landmark and the three-dimensional second landmark derived from the three-dimensional first landmark may be generated based on the geometric model of the standard face as described above (step S340).

It can be understood that the three-dimensional landmark set itself constitutes the three-dimensional face model.

According to an embodiment, the controller 300 may determine whether to update the three-dimensional landmark set (step S350). For example, the controller 300 may calculate a facial pose by using the two-dimensional first landmark DP1 extracted through a facial pose estimation algorithm. When a pitch and yaw of a face are close to 0 degrees according to the facial pose calculated by the controller 300, it may be determined that the three-dimensional face model needs to be updated. For example, when the pitch and the yaw are close to 0 degrees, it can be determined that a user gazes at the front. Needless to say, according to an embodiment, an update condition of the three-dimensional landmark set may be different.

In order to update the three-dimensional landmark, the two-dimensional second landmark $\overline{DP2}$ may be derived by projecting the three-dimensional first landmark TP1 onto a two-dimensional plane using a roll axis of the two-dimensional facial image (step S531).

The two-dimensional first landmark DP1 may include n landmarks, and may be represented as follows.

$$DP1 = \{(a_{x,0}, a_{y,0}), (a_{x,1}, a_{y,1}), \ldots, (a_{x,n}, a_{y,n})\}$$

The three-dimensional first landmark TP1 corresponding to the two-dimensional first landmark DP1 may be represented as follows, and a three-dimensional landmark set B may be represented as follows. In the present invention, it is possible to generate a three-dimensional landmark set including n landmarks (n is a natural number) extracted from the two-dimensional facial image, and m landmarks (m is a natural number>n) derived from the extracted landmarks through the geometric model of the standard face.

$$TP1 = \{(b_{x,0}, b_{y,0}, b_{z,0}), (b_{x,1}, b_{y,1}, b_{z,1}) \ldots (b_{x,n}, b_{y,n}, b_{z,n})\}$$

$$B = \{(b_{x,0}, b_{y,0}, b_{z,0}), (b_{x,1}, b_{y,1}, b_{z,1}), \ldots, (b_{x,n}, b_{y,n}, b_{z,n}), \ldots, (b_{x,m}, b_{y,m}, b_{z,m})\}$$

Among them, the two-dimensional second landmark $\overline{DP2}$ obtained by projecting the three-dimensional first landmark TP1 onto the two-dimensional plane using the roll axis of the facial image may be represented as follows:

$$\overline{DP2}\{(\overline{b}_{x,0}, \overline{b}_{y,0}), (\overline{b}_{x,1}, \overline{b}_{y,1}), \ldots, (\overline{b}_{x,n}, \overline{b}_{y,n})\}$$

In the present invention, the two-dimensional second landmark $\overline{DP2}$ is rearranged as a two-dimensional third landmark, based on a similarity between the two-dimensional first landmarks DP1 and the two-dimensional second landmark $\overline{DP2}$ (step S353).

Specifically, the three-dimensional model generator 200 calculates a similarity transformation S from the two-dimensional first landmark DP1 to the two-dimensional second landmark $\overline{DP2}$.

The similarity transform S may be represented as Equation 1. In Equation 1, T represents a transform vector, c represents a scale, and R represents a rotation matrix.

$$S(X) = T + cR(X) \quad \text{[Equation 1]}$$

A similarity transformation matrix from the two-dimensional first landmark DP1 to the two-dimensional second landmark DP2 may be derived by calculating Equation 2. In Equation $\overline{DP2}[i]$ and DP1[i] represent i-th landmarks of $\overline{DP2}$ and DP1, respectively.

$$S = \arg_{[cR|T]}{}^{min} \Sigma_i \|\overline{DP2}[i] - cR \cdot DP1[i] - T\| \quad \text{[Equation 2]}$$

The three-dimensional model generator 200 performs a vector dot product on the calculated similarity transform S and two-dimensional first landmark DP1 as in Equation 3 to obtain the two-dimensional third landmark DP3. The two-dimensional third landmark DP3 have the same pose and scale as those of the two-dimensional second landmark $\overline{DP2}$ while maintaining a facial feature obtained from the two-dimensional facial image.

$$DP3 = S \cdot DP1 \quad \text{[Equation 3]}$$

The two-dimensional third landmark DP3 may be represented as follows.

$$DP3 = \{(c_{x,0}, c_{y,0}), (c_{x,1}, c_{y,1}), \ldots, (c_{x,n}, c_{y,n})\}$$

The three-dimensional model generator 200 updates the three-dimensional landmark set, based on the two-dimensional third landmark DP3.

According to an embodiment, the three-dimensional model generator 200 may increase positional accuracy of a landmark by using a symmetric enforcing rule with respect to the two-dimensional third landmark DP3.

The two-dimensional first landmark DP1 is information extracted from the actually obtained two-dimensional facial image, from which a three-dimensional first landmark is obtained by using the geometric model of the standard face. In order to match the two-dimensional facial image, the three-dimensional first landmark is projected onto two dimensions, and then is transformed into the two-dimensional third landmark DP3 having a closest distance to a facial landmark.

A distance D between the two-dimensional second landmark $\overline{DP2}$ and the two-dimensional third landmark DP3 may be represented as Equation 4.

$$D = |DP3 - \overline{DP2}| \quad \text{[Equation 4]}$$

A two-dimensional third landmark DP3' adjusted according to the symmetry forcing rule may be obtained through a principle such as Equation 5. In Equation 5, $l_p[k]$ and $r_p[k]$ are k-th elements of $l_p$ and $r_p$ including a left landmark and a right landmark of a face, respectively. In addition, in Equation 5, a f-function is a function of performing a symmetric enforcing rule by projecting a left landmark of a face onto the right or a right landmark of the face onto the left.

$$\text{In case of } \begin{pmatrix} DP3[l_p[k]], \\ DP3'[r_p[k]] \end{pmatrix} = \begin{pmatrix} DP3[l_p[k]], \\ f(DP3[l_p[k]]) \end{pmatrix}, \quad \text{[Equation 5]}$$

$$D[r_p[k]] > D[l_p[k]]$$

In case of other than $DP3[r_p[k]]$)

That is, the three-dimensional model generator 200 may determine that the shorter the distance D between the two-dimensional second landmark $\overline{DP2}$ and the two-dimensional third landmark DP3 the higher the accuracy, select a landmark with high accuracy, and then generate the two-dimensional third landmark DP3' adjusted by performing bilateral symmetry.

In other words, two two-dimensional third landmarks that face each other based on a face central line of the two-dimensional plane are assumed. Equation 5 represents that, among them, when the distance D between the two-dimensional second landmark $\overline{DP2}$ and the two-dimensional third landmark DP3 is long, it is considered that an error is high, and the two-dimensional third landmark DP3 having the short distance D is selected, and bilateral symmetry is performed on the selected two-dimensional third landmark DP3 to replace it with another point.

The three-dimensional landmark set may be generated by using z-axis coordinate information of an existing three-dimensional face model, including the adjusted two-dimensional third landmark DP3'. Specifically, the three-dimensional first landmark TP1 projected as the two-dimensional second landmark $\overline{DP2}$ corresponds to the adjusted two-dimensional third landmark DP3', and accordingly a z coordinate of the third-dimension first landmark TP1 may be inputted as a z coordinate value of the corresponding points of the two-dimensional third landmark DP3'.

The number of the two-dimensional third landmarks DP3' adjusted depending on the embodiment may be the same as the number of two-dimensional first landmarks DP1 and three-dimensional first landmarks TP1. The three-dimensional landmark thus restored is referred to as a three-dimensional third landmark TP3. The three-dimensional third landmarks TP3 are landmarks adjusted so that the three-dimensional first landmark TP1 matches the two-dimensional facial image.

With respect to the adjusted three-dimensional third landmark TP3, the geometric model of the standard face may be used in the same manner to derive a three-dimensional fourth landmark TP4. A process of deriving the three-dimensional fourth landmark TP4 based on the three-dimensional third landmark TP3 may be substantially the same as the process described with reference to FIG. 4. The three-dimensional first landmark TP1 and the three-dimensional second landmark TP2 described with reference to FIG. 1 may respectively correspond to the three-dimensional third landmark TP3 and the three-dimensional fourth landmark TP4 when the three-dimensional landmark set is updated.

A three-dimensional landmark model may be updated as follows by combining the three-dimensional third landmark TP3 and the third-dimensional fourth landmark TP4.

$$B'=\{(c_{x,0},c_{y,0},b_{z,0}),(c_{x,1},c_{y,1},b_{z,1}),\ldots,(c_{x,n'},c_{y,n'},b_{z,n}),\ldots,(c_{x,m},c_{y,m},b_{z,m})\}$$

Referring back to FIG. 3, the three-dimensional face model is projected onto the two-dimensional facial image (step S360). A transformation from a three-dimensional landmark to a two-dimensional landmark may be performed according to Equation 6.

In Equation 6, F represents a two-dimensional projection result for a three-dimensional model X, K represents a camera-specific matrix, P represents an extrinsic parameter (three-dimensional rotation and transformation matrix), and X includes a value of an updated three-dimensional face model B'.

$$F = K \cdot P \cdot X \quad \text{[Equation 6]}$$

$$\begin{bmatrix} u \\ v \\ 1 \end{bmatrix} = \begin{bmatrix} f_x & \gamma & u_0 \\ 0 & f_v & v_0 \\ 0 & 0 & 1 \end{bmatrix} \begin{bmatrix} r_{11} & r_{12} & r_{13} & t_1 \\ r_{21} & r_{22} & r_{23} & t_2 \\ r_{31} & r_{32} & r_{33} & t_3 \end{bmatrix} \begin{bmatrix} x \\ y \\ z \\ 1 \end{bmatrix}$$

In the present invention, landmarks derived from the geometric model of the standard face are assigned with respect to landmarks that are not obtained from the two-dimensional facial image, and thus it is possible to perform landmark matching with high matching even when the two-dimensional facial image is inaccurate.

According to an embodiment, a virtual object may be displayed with respect to at least one landmark included in the projected image (step S370). The virtual object may include various objects that are displayed in an overlapping form with respect to a portion of a face by recognizing a particular area of the face. For example, the displayed virtual object may be used to represent a face to which makeup is applied, or a face with glasses, earrings, and the like.

In the present invention, since a three-dimensional face model including a landmark estimated with respect to a landmark that is not obtained from a two-dimensional facial image is projected onto the two-dimensional facial image, it is possible to naturally display a virtual object even with respect to a portion where the landmark is not obtained from the two-dimensional facial image.

Figure 5:
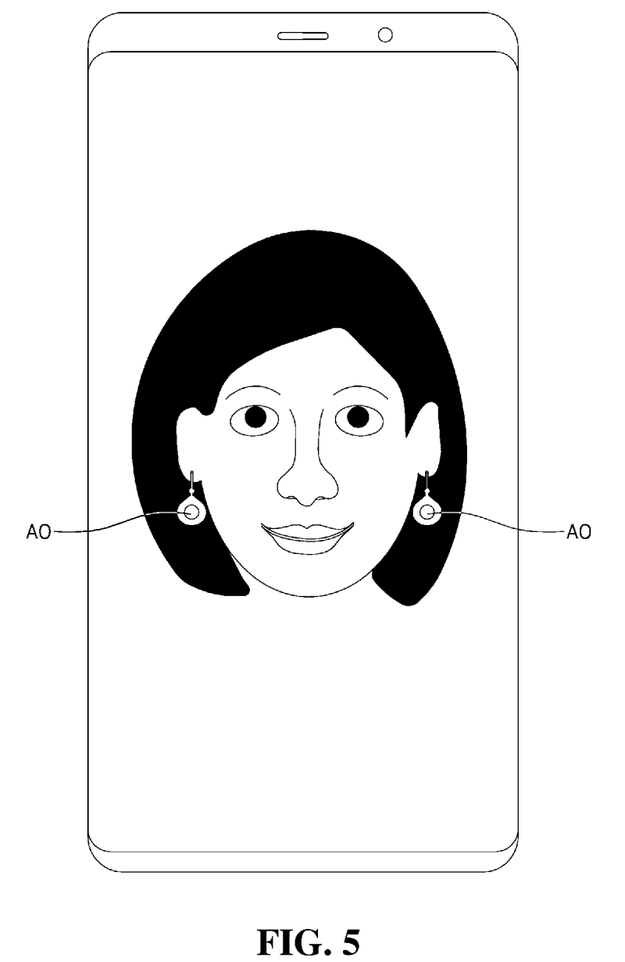
FIG. 5 is an exemplary diagram illustrating an application screen provided by projecting a three-dimensional landmark set generated according to an embodiment of the present invention onto two dimensions.

FIG. 5 is an exemplary diagram illustrating an application screen provided by projecting a three-dimensional landmark set generated according to an embodiment of the present invention onto two dimensions. FIG. 5 illustrates that, when facial landmark detection is performed only with facial data in which a landmark of an ear portion is not annotated, the landmark of the ear portion not annotated in the facial data is estimated using the present invention, and an earring are displayed as a virtual object at a corresponding position.

Referring to FIG. 5, an earring that is a virtual object AO may be displayed with respect to a two-dimensional facial image. The virtual object AO may be displayed by deriving a landmark that is difficult to obtain from the two-dimensional facial image, or may be information that is difficult to easily derive when the two-dimensional facial image is transferred into three dimensions.

For example, in case of using a two-dimensional model with respect to the two-dimensional facial image viewed from the front, it may be difficult to properly predict a landmark, when a user turns his/her head from side to side.

According to the present invention, even when an image of an ear area is not obtained, a landmark for the ear area may be derived, and it is possible to more accurately provide the wearing of earrings to the user by correcting a three-dimensional landmark to be suitable for a two-dimensional facial image.

The above-described image processing method according to the present invention may be flexibly applied to various landmarks of the two-dimensional facial image by deriving landmarks that are not obtained based on the two-dimensional facial image through the geometric model of the standard face in three dimensions and reapplying the landmarks to the two-dimensional facial image.

In the present invention, a computer-readable physical recording medium on which a program for performing the above-described image processing method is recorded may also be included in the scope of the present invention.

A system according to various embodiments may include at least one of the above-described components or additional other components. Alternatively, some components may be omitted. The embodiments disclosed herein are provided to describe technical content and help understanding, but do not limit the scope of the present invention. Accordingly, it should be interpreted that all modifications or various other embodiments derived based on the technical ideas of the present invention are within the scope of the present invention.

DESCRIPTION OF SYMBOLS

100: Two-dimensional image processor
200: Three-dimensional model generator
300: Controller
400: Image integration processor
500: Input/output unit
600: Storage unit

The invention claimed is:

1. A computer-readable physical recording medium on which a program for executing steps is recorded with respect to a computer that performs image processing for estimating a facial landmark on a two-dimensional facial image based on a standard face model, the steps of:
extracting a two-dimensional first landmark from the two-dimensional facial image;
deriving, based on a geometric model of a standard face, a three-dimensional landmark set including a three-dimensional first landmark corresponding to the two-dimensional first landmark;
determining whether to update the three-dimensional landmark set by estimating a pose of the two-dimensional facial image;
updating the three-dimensional landmark set by rearranging the three-dimensional first landmark according to the two-dimensional first landmark according to the determining of whether to update; and
projecting the three-dimensional face model onto the two-dimensional facial image wherein the updating the three-dimensional landmark set further comprises:
deriving a two-dimensional second landmark by projecting the three-dimensional first landmark onto a two-dimensional plane;
deriving a two-dimensional third landmark by rearranging, based on a similarity between the two-dimensional second landmark and the two-dimensional first landmark, the two-dimensional second landmark to correspond to the two-dimensional first landmark;
updating, based on the two-dimensional third landmark, the three-dimensional landmark set; and
generating, based on the updated three-dimensional landmark set, the three-dimensional face model.

2. The computer-readable physical recording medium of claim 1, wherein the three-dimensional landmark set comprises a three-dimensional second landmark defining a landmark different from the three-dimensional first landmark.

3. The computer-readable physical recording medium of claim 2, wherein the step of determining whether to update the three-dimensional landmark set comprises determining, based on a pitch and a yaw of the pose of the two-dimensional facial image, whether to update the three-dimensional landmark set.

4. The computer-readable physical recording medium of claim 1, wherein the step of deriving the two-dimensional third landmark comprises:
a step of calculating a similarity transformation from the two-dimensional first landmark to the two-dimensional second landmark; and
a step of deriving the second two-dimensional third landmark through vector dot products of the two-dimensional first landmark and the similarity transformation.

5. The computer-readable physical recording medium of claim 4, comprising:
a step of generating, based on the two-dimensional third landmark and a geometric model of a standard face, the three-dimensional face model.

6. The computer-readable physical recording medium of claim 5, wherein the geometric model of the standard face comprises information on a distance between at least two of eyes, nose, mouth and ears.

7. The computer-readable physical recording medium of claim 4, comprising:
a step of selecting, with respect to two two-dimensional third landmarks that face each other based on a face central line of a two-dimensional plane, one two-dimensional third landmark having a small distance difference between a corresponding two-dimensional third landmark and a two-dimensional second landmark corresponding to the two-dimensional third landmark; and
a step of replacing another unselected two-dimensional third landmark by symmetrizing the selected one two-dimensional third landmark based on the face central line.

8. A computer-readable physical recording medium on which a program for executing steps is recorded with respect to a computer that performs image processing for estimating a facial landmark on a two-dimensional facial image based on a standard face model, the steps of:
extracting a two-dimensional first landmark from the two-dimensional facial image;
deriving, based on a geometric model of a standard face, a three-dimensional landmark set including a three-dimensional first landmark corresponding to the two-dimensional first landmark;
deriving a two-dimensional second landmark by projecting the three-dimensional first landmark onto a two-dimensional plane;
rearranging, based on a similarity between the two-dimensional second landmark and the two-dimensional first landmark, the two-dimensional second landmark as a two-dimensional third landmark; and
re-deriving, based on the two-dimensional third landmark, the three-dimensional landmark set.

9. The computer-readable physical recording medium of claim 8, on which a program for executing a step of projecting the three-dimensional landmark set onto the two-dimensional facial image is recorded.

10. The computer-readable physical recording medium of claim 9, comprising:
a step of displaying a visual object with respect to at least one landmark among the three-dimensional landmark set.

11. The computer-readable physical recording medium of claim 9, wherein
the three-dimensional landmark set comprises a three-dimensional second landmark different from the three-dimensional first landmark, and
the step of re-deriving, based on the two-dimensional third landmark, the three-dimensional landmark set comprises:

a step of inserting a z coordinate of the three-dimensional first landmark with respect to the two-dimensional third landmark; and a step of deriving, based on a geometric model of a standard face, a three-dimensional fourth landmark with respect to a three-dimensional third landmark into which the z coordinate is inserted.

12. The computer-readable physical recording medium of claim 11, further comprising:

a step of receiving an input for selecting the three-dimensional second landmark.

13. The computer-readable physical recording medium of claim 11, wherein the step of rearranging, based on a similarity between the two-dimensional second landmark and the two-dimensional first landmark, the two-dimensional second landmark as a two-dimensional third landmark comprises:

a step of calculating a similarity transformation from the two-dimensional first landmark to the two-dimensional second landmark; and a step of deriving the two-dimensional third landmark through vector dot products of the two-dimensional first landmark and the similarity transformation.

14. A standard face model-based facial landmark estimation image processing apparatus, the apparatus comprising:

a two-dimensional image processor configured to extract a two-dimensional first landmark from a two-dimensional facial image and project a three-dimensional face model onto the two-dimensional facial image;

a three-dimensional model generating processor configured to derive, based on a geometric model of a standard face, a three-dimensional landmark set including a three-dimensional first landmark corresponding to the two-dimensional first landmark; and a controller processor configured to determine, based on the two-dimensional facial image, whether to update the three-dimensional landmark set, and control the three-dimensional model generating processor to selectively update the three-dimensional landmark set by comparing the three-dimensional first landmark and the two-dimensional first landmark, wherein the three-dimensional model generating processor is configured to:

define the three-dimensional first landmark as a two-dimensional second landmark by projecting the three-dimensional first landmark onto a two-dimensional plane;

rearrange, based on a similarity transformation from the two-dimensional first landmark to the two-dimensional second landmark, the two-dimensional second landmark as a two-dimensional third landmark; and update, based on the rearranged two-dimensional third landmark, the three-dimensional landmark set.

15. The apparatus of claim 14, wherein the three-dimensional model generating processor is configured to generate the three-dimensional landmark set by calculating, based on the geometric model of the standard face, a three-dimensional second landmark different from the three-dimensional first landmark.

* * * * *